United States Patent
Wang

(10) Patent No.: US 12,158,905 B2
(45) Date of Patent: Dec. 3, 2024

(54) EVENT EXTRACTION METHOD, DEVICE AND STORAGE MEDIUM

(71) Applicant: BOE TECHNOLOGY GROUP CO., LTD., Beijing (CN)

(72) Inventor: Bingqian Wang, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 462 days.

(21) Appl. No.: 17/514,576

(22) Filed: Oct. 29, 2021

(65) Prior Publication Data
US 2022/0300546 A1   Sep. 22, 2022

(30) Foreign Application Priority Data
Mar. 22, 2021   (CN) .......................... 202110301630.2

(51) Int. Cl.
| | | |
|---|---|---|
| G06F 16/33 | (2019.01) | |
| G06F 16/332 | (2019.01) | |
| G06F 16/335 | (2019.01) | |
| G06F 40/30 | (2020.01) | |

(52) U.S. Cl.
CPC ...... *G06F 16/3344* (2019.01); *G06F 16/3329* (2019.01); *G06F 16/335* (2019.01); *G06F 40/30* (2020.01)

(58) Field of Classification Search
CPC ............. G06F 16/3329; G06F 16/3344; G06F 16/335; G06F 40/30
See application file for complete search history.

(56) References Cited

U.S. PATENT DOCUMENTS

| | | | |
|---|---|---|---|
| 2016/0275073 A1 | 9/2016 | Poon et al. | |
| 2021/0200947 A1* | 7/2021 | Li | G06N 3/084 |
| 2021/0295095 A1* | 9/2021 | Pan | G06F 40/30 |

(Continued)

FOREIGN PATENT DOCUMENTS

| | | |
|---|---|---|
| CN | 111325020 A | 6/2020 |
| CN | 111401033 A | 7/2020 |

(Continued)

OTHER PUBLICATIONS

Chinese Office Action corresponding to Chinese Patent Application No. 202110301630.2 (Foreign Text and English Translation Thereof, 16 Pages) (May 31, 2024).

*Primary Examiner* — Angela A Armstrong
(74) *Attorney, Agent, or Firm* — Myers Bigel, P.A.

(57) ABSTRACT

The application discloses an event extraction method, apparatus, device and storage medium, the method including acquiring a text to be processed, inputting the text to be processed into an event detection model to determine an event type involved in the text to be processed, constructing a first query corpus based on the event type, inputting the text to be processed and the first query corpus into a reading comprehension model to determine an event body corresponding to the event type and event elements corresponding to the event body, obtaining an event extraction result of the text to be processed based on the event body and the event elements. This method accurately determines the event type and the event elements in the text to be processed, and is adapted to event extraction in a document level text, improving the overall performance of event extraction and promoting the efficiency of event extraction.

14 Claims, 7 Drawing Sheets

(56) References Cited

U.S. PATENT DOCUMENTS

2021/0406476 A1    12/2021  Pan et al.
2022/0004714 A1*    1/2022  Li ........................ G06F 40/216

FOREIGN PATENT DOCUMENTS

| CN | 111475617 A |  7/2020 |
| CN | 111783394 A | 10/2020 |
| CN | 111967268 A | 11/2020 |
| CN | 112052682 A | 12/2020 |
| CN | 112507059 A |  3/2021 |

* cited by examiner

EVENT EXTRACTION METHOD, DEVICE AND STORAGE MEDIUM

CROSS REFERENCE TO RELATED APPLICATIONS

The present application claims the priority benefits of the patent application No. 202110301630.2 filed with the Patent Office of China on Mar. 22, 2021, the disclosure of which is incorporated herein by reference.

TECHNICAL FIELD

This disclosure generally relates to the technical field of natural language processing, and specifically to an event extraction method, apparatus, device and storage medium.

BACKGROUND

With the continuous development of network information technology, the amount of online text information on the Internet has increased dramatically, and particularly during the explosive growth of digitalization in the financial sector, there are a great number of financial documents, e.g., numerous company announcements and company annual reports, but the data is mostly non-structured or semi-structured data, which requires manual analysis to obtain structured data. In order to make better major decisions such as investment analysis, asset management and so on in the financial sector, it is necessary to process tons of financial documents. Event extraction is a key technique for processing large-scale text information and plays a crucial role in information processing, and event extraction refers to identifying an event of specific type event from text information and determining and extracting information related to the event.

SUMMARY

An embodiment of the application provides an event extraction method, comprising: acquiring a text to be processed; inputting the text to be processed into an event detection model to determine an event type involved in the text to be processed; constructing a first query corpus based on the event type; inputting the text to be processed and the first query corpus into a reading comprehension model to determine an event body corresponding to the event type and an event element corresponding to the event body; and obtaining an event extraction result of the text to be processed based on the event body and the event element.

In some embodiments, the event detection model comprises a first semantic extraction model and a first output model, wherein the inputting the text to be processed into the event detection model to determine the event type involved in the text to be processed comprises: splicing the text to be processed with a predefined event type to obtain a first spliced text; inputting the first spliced text into the first semantic extraction model to obtain at least one first semantic vector; splicing the at least one first semantic vector to obtain a first semantic vector sequence; and performing binary classification processing on the first semantic vector sequence via the first output model to determine the event type involved in the text to be processed from the predefined event type.

In some embodiments, the first semantic extraction model comprises a plurality of transformation models connected sequentially and a plurality of output sub-models in one-to-one correspondence with the plurality of transformation models, wherein the inputting the first spliced text into the first semantic extraction model to obtain the at least one first semantic vector comprises: encoding the first spliced text into a word embedded vector and a position embedded vector; adding the word embedded vector and the position embedded vector to obtain an input vector; providing the input vector to the plurality of transformation models, thereby outputting a sub-output vector from each transformation model of the plurality of transformation models; classifying by each output sub-model of the plurality of output sub-models the sub-output vector outputted from the transformation model to obtain a sub-weight vector corresponding to the transformation model; normalizing a plurality of sub-weight vectors including the sub-weight vector corresponding to the plurality of transformation models to obtain a total weight vector; splicing a plurality of sub-output vectors including the sub-output vector corresponding to the plurality of transformation models to obtain a total output vector; and obtaining the first semantic vector based on the total output vector and the total weight vector.

In some embodiments, the reading comprehension model comprises a first model and a second model cascaded with the first model, wherein the inputting the text to be processed and the first query corpus into the reading comprehension model to determine the event body corresponding to the event type and event element corresponding to the event body comprises: splicing the first query corpus with the text to be processed to obtain a second spliced text; inputting the second spliced text into the first model to determine the event body corresponding to the event type; constructing a second query corpus based on the event body; splicing the second query corpus with the text to be processed to obtain a third spliced text; and inputting the third spliced text into the second model to determine the event element corresponding to the event body.

In some embodiments, the first model comprises a second semantic extraction model and a second output model, wherein the inputting the second spliced text into the first model to determine the event body corresponding to the event type comprises: inputting the second spliced text into the second semantic extraction model to obtain at least one second semantic vector; splicing the at least one second semantic vector to obtain a second semantic vector sequence; performing binary classification processing on the second semantic vector sequence by the second output model to determine a start position and an end position of the event body in the text to be processed; and determining the event body corresponding to the event type based on the start position and the end position.

In some embodiments, the second model comprises a third semantic extraction model and a third output model, wherein the inputting the third spliced text into the second model to determine the event element corresponding to the event body comprises: inputting the third spliced text into the third semantic extraction model to obtain at least one third semantic vector; splicing the at least one third semantic vector to obtain a third semantic vector sequence; and performing binary classification processing on the third semantic vector sequence by the third output model to determine a span of the event element in the text to be processed.

In some embodiments, the performing binary classification processing on the third semantic vector sequence by the third output model to determine the span of the event element in the text to be processed comprises: determining, for each character in the third semantic vector sequence, whether the character is the span of the event element by a binary classification network in the third output model.

In some embodiments, the obtaining the event extraction result of the text to be processed based on the event body and the event element comprises: acquiring an index value of the event element in the text to be processed; based on the index value, sorting the event element corresponding to the event body to obtain the event extraction result.

In some embodiments, the event detection model is constructed by steps of: acquiring historical text data, the historical text data comprising a training set and a validation set; training a first semantic extraction model and first output model to be constructed with the training set, to obtain a first semantic extraction model and first output model to be validated; and optimizing the first semantic extraction model and first output model to be validated by means of the validation set to minimize a first loss function, obtaining the first semantic extraction model and the first output model.

In some embodiments, the reading comprehension model is constructed by steps of: acquiring historical text data, the historical text data comprising a training set and a validation set; training a first model and second model to be constructed with the training set, to obtain a first model and second model to be validated; optimizing the first model and second model to be validated by means of the validation set to minimize a second loss function, thereby obtaining the first model and the second model.

Another embodiment of the application provides a terminal device comprising a memory, a processor and a computer program stored on the memory and runnable on the processor, the processor being configured, when executing the computer program, to implement the event extraction method according to the above embodiments.

Yet another embodiment of the application provides a non-transitory computer-readable storage medium, comprising a computer program stored thereon, the computer program being configured to implement the event extraction method according to the above embodiments.

BRIEF DESCRIPTION OF DRAWINGS

By referring to the detailed description of the nonrestrictive embodiments with reference to the drawings, other features, goals and advantages of the technical solutions of the application will be more obvious.

DETAILED DESCRIPTION OF EMBODIMENTS

Figure 1:
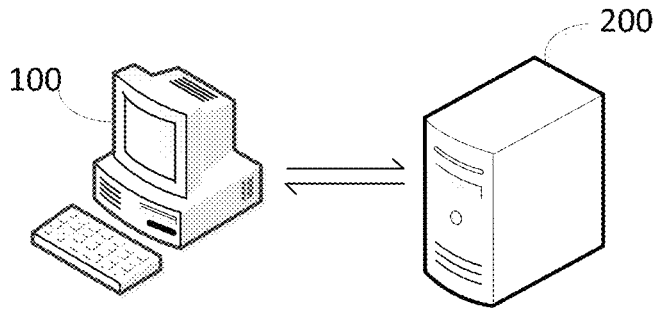
FIG. 1 illustrates a system architecture of an application environment for an event extraction method provided in an embodiment of the present application.

The present application will be further explained in detail in combination with the drawings and the embodiments. It can be understood that the specific embodiments described herein are only used for explaining related principles of the application, instead of limiting the protection scope of the present application. Besides, it should be further noted that in order to facilitate the description, only portions related to the technical solutions of the embodiments are shown in the drawings.

It should be noted that the embodiments in the present application and the features of the embodiments may be combined with each other under the circumstances where there is no conflict. The present application will be explained in detail with reference to the drawings and the embodiments.

With the continuous development and popularity of the Internet, online information is exploding, and how to find required information timely and accurately from massive natural language documents is becoming an urgent problem. Factual information such as entities, relations, events of a specified type may be extracted from loose unstructured ordinary text by means of information extraction technology and outputted as structured data. The event extraction technology has been applied in many financial structured sectors, e.g., extraction of company announcements and construction of financial event maps, thereby converting unstructured data that cannot be understood by computers into structured data that can be understood by computers. Event extraction mainly studies how to extract basic information of an event from unstructured natural language text, e.g., type of event, participant of event, occurrence time of event, occurrence place of event, etc., and present it in a structured form.

For example, in the financial sector, "event" is a reference for a major decision of invest analysis and asset management, and an "event" in the financial sector comprises information on financial fraud, insufficient solvency, loss of contact/death of senior executives, corporate bankruptcy, major compensation, major accidents, equity freezing, equity pledge, shareholding increase, shareholding reduction, etc. As the scale of netizens continues to expand, web page data has also witnessed a massive increase, so how to dig out events efficiently from massive information becomes very important.

In related arts, event extraction is based on template matching and machine learning, and event extraction is only directed at a sentence level text. For a document level text, there may be a large number of escape symbols in the text, as well as element confusion caused by uncanonical expressions, such as missing spaces between multiple amounts, and event elements in a document level text may appear in any position of the document and thus be distributed in different sentences, and moreover, some financial texts contain complicated table events, in which one same event type may correspond to a plurality of event bodies, i.e., a plurality of sub-events, and the event bodies may have abbreviations. As a result, the extraction of related elements in the event has a low accuracy, which affects the overall performance of event extraction.

Based on the above defects, the embodiments of the present application provide an event extraction method, apparatus, device and storage medium, and as compared with the related arts, by constructing an event detection model, the method is capable of determining an event type involved in a text to be processed accurately, and by constructing a reading comprehension model based on the event type determined by the event detection model, it is capable of determining event elements in the text to be processed completely and accurately, and is therefore adapted to the event extraction in a document level text, which improves the overall performance of event extraction and further promotes the efficiency of event extraction.

The solutions provided in the embodiments of the application involve technologies such as natural language processing and machine learning in artificial intelligence, and will be specifically explained by the following embodiments.

FIG. 1 shows an architecture of an implementation environment of an event extraction method provided in an embodiment of the present application. As shown in FIG. 1, the implementation environment architecture comprises a terminal 100 and a server 200.

The terminal 100 may be a terminal device in various AI application scenarios. For example, the terminal 100 may be a smart home device such as smart TV and smart TV set-top box, or the terminal 100 may be a mobile portable terminal such as smart phone, tablet computer and e-book reader, or the terminal 100 may be a smart wearable device such as smart glasses, smart watch, etc., and the specific form of the terminal 100 is not specifically limited herein.

The terminal 100 may be equipped with an AI application based on natural language process. For example, the AI application may be an application such as smart search, smart question answering, etc.

The server 200 may be a server, or a server cluster consisting of several servers, or alternatively the server 200 may comprise one or more virtualized platform, or the server 200 may be a cloud computing service center.

The server 200 may be a server device providing background service for the AI application installed in the terminal 100.

A communicative connection is established between the terminal 100 and the server 200 by a wired or wireless network. For example, the wireless network or wired network uses a standard communication technique and/or protocol. The network is usually in the form of the Internet, but it may also be any network, including but not limited to Local Area Network (LAN), Metropolitan Area Network (MAN), Wide Area Network (WAN), mobile, wired or wireless network, private network, virtual private network, or any combination thereof.

During the provision of AI application service, the AI application system based on natural language processing may extract a text to be processed by using an event detection model and a reading comprehension model to obtain an event extraction result and provide AI application service based on the event extraction result. The event detection model and the reading comprehension model may be arranged in the server 200 and be trained and applied by the server; alternatively, the event detection model and the reading comprehension model may be arranged in the terminal 100, and be trained and updated by the server 200.

To facilitate understanding and explanation, the event extraction method, apparatus, device and storage medium provided in the embodiments of the present application will be expounded with reference to FIG. 2 to FIG. 12.

Figure 2:
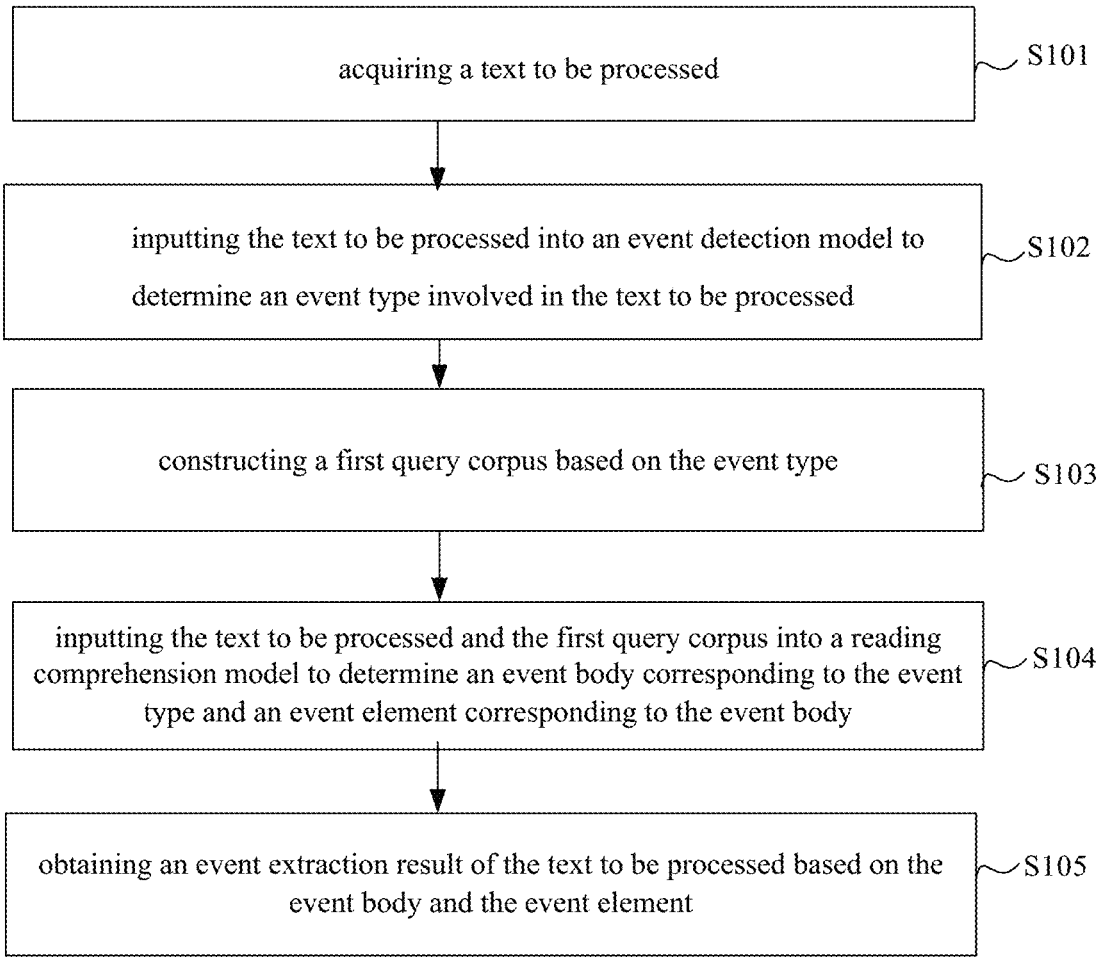
FIG. 2 is a schematic flow chart of an event extraction method provided in an embodiment of the present application.

FIG. 2 shows a flow chart of an event extraction method provided in an embodiment of the application, and the method may be implemented by a computer device, and the computer device may be the server 200 or terminal 100 in the system shown in FIG. 1, or alternatively, the computer device may be a combination of the terminal 100 and the server 200.

As shown in FIG. 2, the method comprises the following steps.

S101, acquiring a text to be processed.

Specifically, the text to be processed may be a document level text or a sentence level text, and the text to be processed may contain text in a table format, and the language of the text to be processed in this embodiment may be Chinese, or English, or other languages, and the language type of the text to be processed is not specifically limited herein.

The text to be processed may be a text of any text type acquired by the computer device, for example, it may be a text to be processed acquired from a position specified by a user, or a text to be processed imported from other external devices, or a text to be processed submitted by the user to the computer device, which is not limited herein. The number of the text to be processed may be one or more, and each text to be processed may comprise at least one word.

The text to be processed refers to a text from which events need to be extracted, and the text to be processed may be a text in any sector, including a text in the financial sector, e.g., an example of the text to be processed may be "Announcement of Zhejiang Zhongke Company on the completion of the shareholding reduction plan of total shareholding of more than 5% of the shares, Special reminder: Shenzhen Anche Technologies Corporation reduced its holdings of 477090 shares of the company by means of centralized bidding on January 8th".

S102, inputting the text to be processed to an event detection model to determine an event type involved in the text to be processed.

In this embodiment, the event detection model comprises a first semantic extraction model and a first output model. All event types may be predefined. After the text to be processed is acquired, the text to be processed may be segmented according to a preset length so as to divide the text to be processed into a plurality of sentence sequences. For each sentence sequence, all event types predefined and the sentence sequence may be inputted into the first semantic extraction model to obtain a first semantic vector, and then the first semantic vector is inputted into the first output model to determine an event type involved in the text to be processed.

An example of the first semantic extraction model may be a pre-training language model NEZHA, it may be configured to extract semantic features of a document level text and output a first semantic vector, and the first output model may comprise a fully connected layer and an activation function, which is capable of performing binary classification processing on the first semantic vector outputted from the first semantic extraction model to obtain event elements in the text to be processed.

Figure 3:
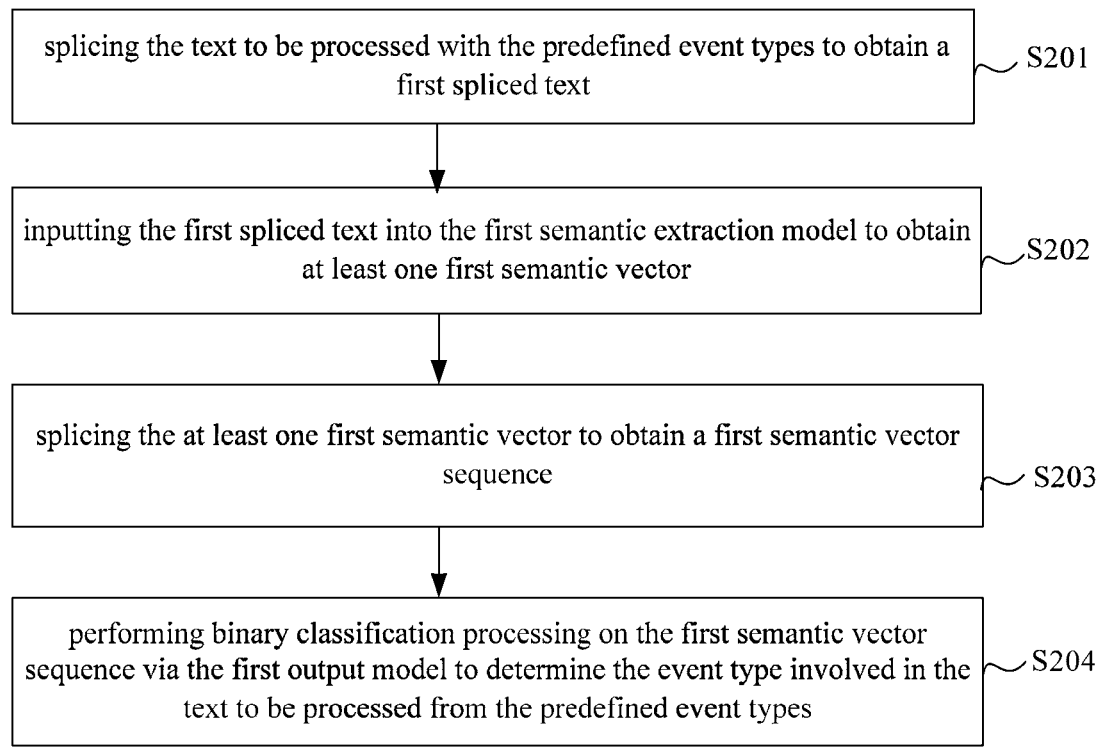
FIG. 3 is a schematic flow chart of a method for determining an event type provided in an embodiment of the present application.

As a possible implementation, based on the above embodiments, as shown in FIG. 3, the step S102 may comprise the following steps.

S201, splicing the text to be processed with all event types predefined to obtain a first spliced text.

For different texts to be processed, different sets of event types may be predefined, e.g., for text information relating to a stock company, all event types predefined may for example comprise death of senior executives, bankruptcy liquidation, major asset loss, major compensation, major safety accident, shareholder increase, shareholder reduction, equity freeze, equity pledge, etc.

After the text to be processed is acquired, since the acquired text to be processed may be excessively long, and a lot of resources may be consumed if the text to be processed is directly inputted into the event detection model, thus it is necessary to segment the text to be processed, e.g., the text to be processed may be segmented according to 1024 words, and therefore the text to be processed is segmented into a plurality of sub-texts. For each sub-text, the sub-text may be spliced with all event types predefined according to a preset format to obtain a first spliced text.

if the first semantic extraction model is a pre-training language model, the preset format may for example be [CLS]+text to be processed+[SEP]+[UNUSED1]+event type+[SEP], [CLS] and [SEP] are unique flag bits in the pre-training language model, which represent a start separator and an end separator of a sentence respectively, and [UNUSED1] is a reserved word in the pre-training language model dictionary, which may represent any unregistered word. The event type may comprise all event types predefined.

S202, inputting the first spliced text into the first semantic extraction model to obtain at least one first semantic vector.

Figure 4:
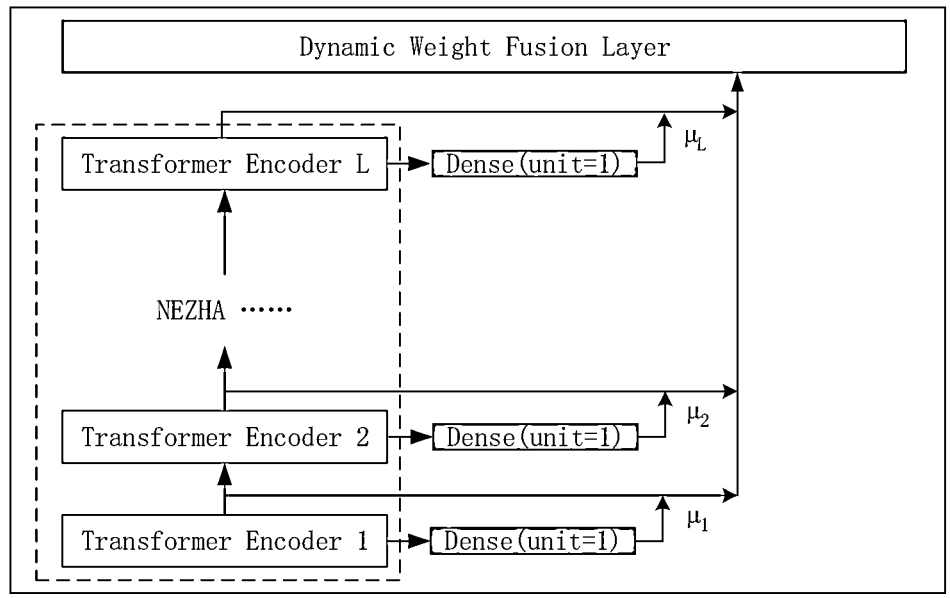
FIG. 4 is a schematic structure view of a first semantic extraction model provided in an embodiment of the present application.

Specifically, the first semantic extraction model may be a pre-training language model AWF-NEZHA configured to extract semantic features of the text to be processed. As shown in FIG. 4, the first semantic extraction model comprises a plurality of transformation models "Transformer Encoders" connected sequentially and output sub-models in one-to-one correspondence with the transformation models. The output sub-model may comprise a fully connected layer Dense and an activation function. The number of the transformation models and the output sub-models may be customized according to the different needs of users, e.g., it may be at least two, and different transformation models correspond to different model parameters.

The plurality of transformation models connected sequentially means that the output of a former transformation model is used as input of a latter transformation model. For example, in case three transformation models are connected sequentially, the output of the first transformation model is used as an input of the second transformation model, and thus a corresponding output is obtained by the second transformation model, and the output of the second transformation model is used as an input of the third transformation model, and thus a corresponding output is obtained by the third transformation model.

The transformation model Transformer Encoder is a machine learning model based on attention mechanism, capable of processing all words or symbols in the text in parallel, and meanwhile combining the context with a remote word by using the attention mechanism. By processing all words in parallel, it enables each word to notice other words in the sentence in multiple processing steps.

In this embodiment, after the first spliced text is obtained, the first spliced text may be encoded to obtain a word embedded vector and a position embedded vector, which are then added to obtain an input vector. The input vector is received by the plurality of transformation models connected sequentially and a corresponding sub-output vector is outputted from each transformation model. Then sub-output vectors corresponding to the transformation models are classified by the output sub-models corresponding to the plurality of transformation models to obtain sub-weight vectors corresponding to the transformation models, and the sub-weight vectors corresponding to the transformation models are normalized to obtain a total weight vector, and the sub-output vectors corresponding to the transformation models are spliced to obtain a total output vector, and at least one first semantic vector is obtained based on the total output vector and the total weight vector.

During the processing of the input vector by the plurality of transformation models, the input vector may be inputted into the first transformation model Transformer Encoder 1 of the plurality of transformation models first to obtain an output corresponding to the first transformation model Transformer Encoder 1, and the output is then used as an input of a next transformation model Transformer Encoder 2 to obtain a next output, and so on, the output of a former transformation model is used as the input of a latter transformation model, and through sequential fusion encoding of the input vector by the transformation models, the output of the last transformation model, i.e., the sub-output vector corresponding to the last transformation model, can be determined.

Specifically, a mapping processing may be performed on the first spliced text based on a dictionary, and words in the first spliced text may be mapped into a digital id, i.e., $x_1, x_2, \ldots, x_n$, in other words, the first spliced text is mapped into a spliced vector $X=(x_1, x_2, \ldots, x_n)$ and then is encoded into a word embedded vector $W_t$ and a position embedded vector $W_p$. The word embedded vector $W_t$ and the position embedded vector $W_p$ are added to obtain an input vector $h_0$. Then the input vector $h_0$ is processed by an N-layered transformation model to obtain sub-weight vectors $h_l$ corresponding to the transformation models Transformer Encoder, which may be represented by the following formula:

$$h_0 = XW_t + W_p$$

$$h_l = \text{Transformer}(h_{l-1}), l \in [1, N]$$

where $h_0$ is an input vector, X is a spliced vector, $W_t$ is a word embedded vector, $W_p$ is a position embedded vector, $h_l$ is a hidden layer vector, i.e., a sub-output vector of the 1-th layer transformation model Transformer.

For example, when the word embedded vector satisfies $W_t=(W_{t1}, W_{t2}, \ldots, W_{tm})$, the spliced vector satisfies $X=(x_1, x_2, \ldots, x_n)$ and the position embedded vector satisfies $W_p(W_{p1}, W_{p2}, \ldots, W_{pn})$ the wording embedded vector may be multiplied by the position embedded vector via $h_0=XW_t+W_p$ to obtain a corresponding result, and the result is added to the position embedded vector to obtain the input vector $h_0$.

In order to effectively utilize the information from each transformation model Transformer, the sub-weight vectors corresponding to the transformation models are obtained by classifying the sub-output vectors corresponding to the transformation models by the output sub-models corresponding to the transformation models, i.e., the importance μ of each transformation model Transformer is learnt by the fully connected layer, and a sub-weight vector is then obtained by weighted superposition by the following formula:

$$\mu_l = \sigma(\text{Dense}_{unit=1}(h_l))$$

where σ is relu activation function, $\mu_l$ is a sub-weight vector corresponding to the l-th layer transformation model Transformer, $h_l$ is a sub-output vector of the l-th transformation model Transformer, Dense represents a fully connected layer, and Dense(•) represents a function corresponding to the fully connected layer. The sub-weight vectors corresponding to the transformation models are spliced, and then are normalized through softmax function to obtain a total weight vector of 1*L, which may be represented by the following formula:

$$\mu_L = \text{soft max}(\text{concatenate}([\mu_1, \mu_2, \ldots, \mu_l]))$$

where $\mu_l$ is a sub-weight vector corresponding to the l-th layer transformation model Transformer, $\mu_L$ is a total weight vector, softmax(•) is an activation function, concatenate(•) is a connection function, configured to fuse the sub-weight vectors corresponding to the transformation models. The sub-output vectors corresponding to the transformation models in the N-layered transformation models transformer are then spliced to obtain a total output vector $h_L$, which may be represented by the following formula:

$$h_L = \text{concatenate}([h_1, h_2, \ldots, h_l])$$

where $h_l$ is a sub-output vector corresponding to the l-th layer transformation model Transformer, $h_L$ is a total output vector, concatenate(•) is a connection function, configured to fuse the sub-output vectors corresponding to the transformation models. A weighted sum of the total output vector and the total weight vector is calculated by the Dynamic Weight Fusion Layer to obtain a first semantic vector $h_{AWF}$, which may be represented by the following formula:

$$h_{AWF} = \text{matmul}([\mu_L, h_L])$$

where μL is a total weight vector, $h_L$ is a total output vector, $h_{AWF}$ is a first semantic vector, matmul(•) represents matrix multiplication. The sub-weight vectors are updated automatically according to the importance of each layer transformation model during the training, so they can be referred to as adaptive weight fusion NEZHA, and a plurality of first semantic vectors may be obtained in the above manner S203, splicing the at least one first semantic vector to obtain a first semantic vector sequence.

S204, performing binary classification process on the first semantic vector sequence via the first output model to determine the event type involved in the text to be processed from the all event types.

Specifically, after the plurality of first semantic vectors are obtained, the at least one first semantic vector may be spliced to obtain a first semantic vector sequence, e.g., first semantic vectors labeled by UNUSED1 are extracted from a corresponding position of each first spliced text, and these first semantic vectors are spliced together to form a first semantic vector sequence, the first semantic vector sequence may comprise at least one event type.

Then, the first semantic vector sequence is subjected to binary classification process via a first output model to determine an event type in the text to be processed, and the first output model comprises a fully connected layer and an activation function Sigmoid, where the first semantic vector sequence may be processed by the fully connected layer to obtain a fully connected vector, and the fully connected vector is processed by the activation function to obtain a prediction result set of the text to be processed, and the prediction result set may comprise 0 and 1, where the event type corresponding to a position with an output of 0 is not an event type involved in the text to be processed, and the event type corresponding to a position with an output of 1 is an event type involved in the text to be processed.

The first output model may comprise but is not limited to a fully connected layer and an activation function. The fully connected layer may be either a single-layered structure or a multi-layered structure. The fully connected layer is mainly configured to classify fused word vectors. The activation function may be softmax function, and the activation function is configured to add a non-linear factor so as to convert an input of continuous real values into an output between 0 and 1.

According to an embodiment of the application, the event detection model is pre-trained based on historical text data. The procedure of training the event detection model may comprise: acquiring historical text data, the historical text data comprising a sample text and an event type corresponding to the sample text, and the historical text data is divided into a training set and a validation set, where the training set is configured to train a first semantic extraction model and first output model to be constructed (i.e., an initial first semantic extraction model and an initial first output model), to obtain a trained first semantic extraction model and first output model, and the validation set is configured to validate the trained first semantic extraction model and first output model to validate the performance of the first semantic extraction model and the first output model. That is, the first semantic extraction model and first output model to be constructed are trained using the training set, to obtain a first semantic extraction model and first output model to be validated; and the first semantic extraction model and first output model to be validated are optimized to minimize a first loss function using the validation set, to obtain the first semantic extraction model and the first output model, based on which the event detection model is obtained.

During the training of the event detection model, the historical text data may be inputted into the initial first semantic extraction model and the initial first output model, to obtain an event detection result, and the event detection result ỹ may be represented by the following formula:

$$\tilde{y} = \sigma(W_t h_{AWF\text{-}T} + b_t)$$

where $W_t$ is a preset trainable parameter vector and satisfies $W_t \in R^{2 \times H}$, H is a dimension of the network hidden layer in the first semantic extraction model, $b_t$ is a bias term, $h_{AWF\text{-}T}$ is a tensor of [1*K*H] extracted from $h_{AWF}$, K is the number of event types, and $h_{AWF}$ is a pre-trained first semantic vector.

After the event detection result ỹ is obtained, a binary cross entropy loss function may be used as an objective function (i.e., the first loss function) of the event detection model, and the objective function may be presented by the following formula:

$$\text{loss} = \Sigma_i^K(y_i \log(\tilde{y}_i) + (1 - y_i)\log(\tilde{y}_i))$$

where K is the number of event types, $y_i$ and $\tilde{y}_i$ represent respectively a true label value and a model prediction value in the i-th position (referring to a position of an event type matching with a predefined event type in the text to be processed). Then parameters in the first semantic extraction model and the first output model to be validated are optimized to minimize the first loss function, obtaining the first semantic extraction model and the first output model, thereby obtaining the event detection model.

Using the first loss function to update the parameters in the first semantic extraction model and first output model to be validated may comprise: upon determining by the first loss function that the first semantic extraction model and first output model to be validated have not converged, adjusting the parameters in the models such that the first semantic extraction model and first output model to be validated converge, thereby obtaining the first semantic extraction model and the first output model. Convergence of the first semantic extraction model and first output model to be validated may mean that a difference between the output result of the first semantic extraction model and first output model to be validated and a label result in the training data is smaller than a preset threshold, or a difference gradient between the output result and the label result in the training data approaches a certain lower value. When the calculated first loss function is smaller, or a difference between the calculated first loss function and the first loss function from the previous iteration approaches 0, it is considered that the first semantic extraction model and first output model to be validated have converged.

Figure 5:
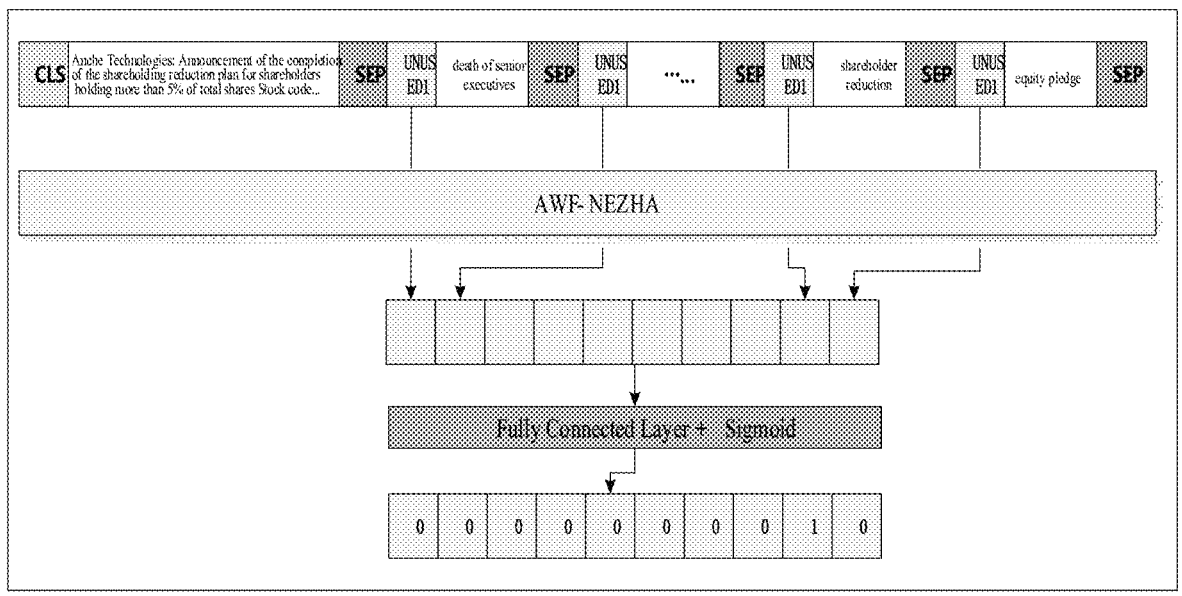
FIG. 5 is an exemplary schematic view of a procedure of determining an event type provided in an embodiment of the present application.

Exemplarily, as shown in FIG. 5, after the text to be processed is acquired, e.g., the text to be processed is "Anche Technologies: Announcement of the completion of the shareholding reduction plan for shareholders holding more than 5% of total shares, Stock code . . . ", and all conventional event types predefined may comprise "death of senior executives, bankruptcy liquidation, major asset loss, major compensation, major safety accident, shareholder increase, shareholder reduction, equity freeze, equity pledge", and the text to be processed and all event types predefined may be spliced according to a preset format to obtain a first spliced text, e.g., the first spliced text is: [CLS]+"Anche Technologies: Announcement of the completion of the shareholding reduction plan for shareholders holding more than 5% of total shares Stock code . . . "+[SEP]+[UNUSED1]+death of senior executives+[SEP]+[UNUSED1]+bankruptcy liquidation+[SEP]+[UNUSED1]+major asset loss+[SEP]+[UNUSED1]+major compensation+ . . . +[SEP]+[UNUSED1]+share-holding increase+[SEP]+[UNUSED1]+equity pledge. Then the first spliced text is inputted into the first semantic extraction model AWF-NEZHA to obtain at least one first semantic vector, and the at least one first semantic vector is spliced to obtain a first semantic vector sequence, and then the first semantic vector sequence is subjected to binary classification process via the first output model. The first semantic vector sequence may be processed into a fully connected vector through the fully connected layer first, and the fully connected vector is processed using the activation function to obtain an event prediction result set comprising 0 and 1, where the event type corresponding to a position with an output of 1 in the finally outputted event prediction result set is an event type involved in the text to be processed, thereby determining that the event type involved in the text to be processed is shareholder reduction.

As compared with a classification prediction method adopted in a traditional event detection, this embodiment can take labels of the event type into consideration in the input of the model, i.e., to splice all event types with the text to be processed and supervise the current text to be processed using all event types predefined, thereby achieving detection of the event type.

S103, constructing a first query corpus based on the event type.

In this step, after the event type involved in the text to be processed is determined, a first query corpus may be constructed for each event body according to a mapping relationship between the preset event type and the event body.

An example of the mapping relationship between the event type and the event body can be shown in the following table:

| Event type | Event body |
|---|---|
| Death of senior executives | Senior executives |
| Bankruptcy liquidation | Company name |
| Major asset loss | Company name |
| Major compensation | Company name |
| Major safety accident | Company name |
| Shareholder increase | Shareholder increasing shareholdings |
| Shareholder reduction | Shareholder reducing shareholdings |
| Equity freeze | Shareholder whose shareholdings are frozen |
| Equity pledge | Pledger |

Exemplarily, when the event type is shareholder reduction, the corresponding event body is the shareholder reducing shareholdings; when the event type is shareholder increase, the corresponding event body is the shareholder increasing shareholdings; when the event type is equity pledge, the corresponding event body is the pledger.

After the event type is determined, a first query corpus may be constructed for each event body, e.g., for the event of "shareholder reduction", a query may be constructed as "What are the shareholders reducing their shareholdings in shareholder reduction?".

S104, inputting the text to be processed and the first query corpus into a reading comprehension model to determine an event body corresponding to the event type and an event element corresponding to the event body.

Specifically, the reading comprehension model may comprise a first model and a second model cascaded with each other, and the first model is configured to extract an event body from the text to be processed, and the second model is configured to extract an event element from the text to be processed based on the event body. The first model and the second model may be trained and optimized at the same time.

The first model may comprise a second semantic extraction model and a second output model, and after the first query corpus is determined, the first query corpus and the text to be processed may be processed by the second semantic extraction model to obtain a second semantic vector, and then the second semantic vector is inputted into the second output model to determine an event body corresponding to the event type. By the same token, the second model may also comprise a third semantic extraction model and a third output model.

The second semantic extraction model and the third semantic extraction model may be a pre-training language model AWF-NEZHA, configured to extract semantic features of a document level text and output a second semantic vector and a third semantic vector respectively, and the second output model and the third output model may each comprise a fully connected layer and an activation function, and are capable of performing binary classification processing on the second semantic vector outputted from the second semantic extraction model to obtain an event body corresponding to the even type, and performing binary classification process on the third semantic vector outputted from the third semantic extraction model to obtain the event element corresponding to the event body.

Figure 6:
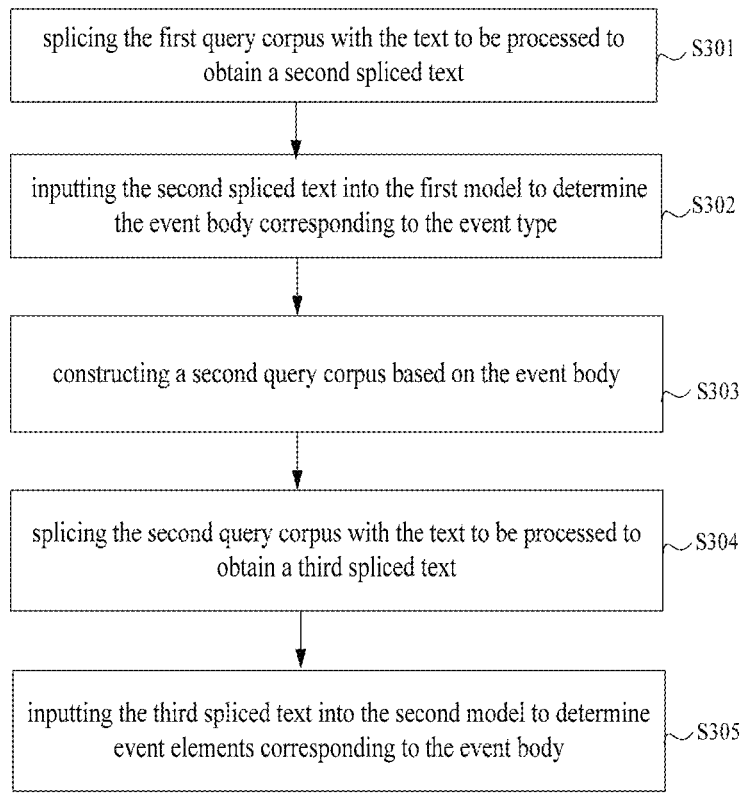
FIG. 6 is a schematic flow chart of a method for determining event elements provided in an embodiment of the present application.

In some embodiments, as shown in FIG. 6, the step S104 may comprise the following steps.

S301, splicing the first query corpus with the text to be processed according to a preset format to obtain a second spliced text. In this step, after the first query corpus is obtained, the first query corpus may be spliced with the text to be processed according to a preset format to obtain a second spliced text, and an example of the preset format may be [CLS]+first query corpus+[SEP]+text to be processed [SEP].

For example, if the determined event type is "shareholder reduction", and the constructed first query corpus is "What are the shareholders reducing their shareholdings in shareholder reduction?", the obtained second spliced text may be "[CLS]What are the shareholders reducing their shareholdings in shareholder reduction?[SEP]Anche Technologies: Announcement of the completion of the shareholding reduction plan of total shareholding of more than 5% of shares Stock code:300572 Stock abbreviation: Anche Technologies [SEP]".

S302, inputting the second spliced text into the first model to determine the event body corresponding to the event type. The first model comprises a second semantic extraction model and a second output model. After the second spliced text is obtained, the second spliced text may be inputted into the second semantic extraction model first to obtain at least one second semantic vector, and the at least one second semantic vector is spliced to obtain a second semantic vector sequence, and then the second semantic vector sequence is subjected to binary classification processing through the second output model to determine a start position and an end position of the event body in the text to be processed, and the event body corresponding to the event type is determined based on the start position and the end position of the event body in the text. The second output model may comprise two binary classification networks.

The second semantic extraction model may be a pre-training language model AWF-NEZHA configured to extract semantic features of the text to be processed and the first query corpus. Similar to the first semantic extraction model in structure, the second semantic extraction model comprises a plurality of transformation models Transformer Encoders connected sequentially and output sub-models in one-to-one correspondence with the transformation models. The output sub-model may comprise a fully connected layer Dense and an activation function.

In an embodiment, after the second spliced text is obtained, the procedure of inputting the second spliced text into the second semantic extraction model to obtain at least one second semantic vector is similar to the procedure of inputting the first spliced text into the first semantic extraction model to obtain at least one first semantic vector.

The second semantic vectors may be spliced according to a preset sequence to obtain a second semantic vector sequence, and then the second semantic vector sequence is subjected to binary classification processing via the second output model, for example, the binary classification processing may be performed by two binary classification networks. The second semantic vector sequence may be processed by a fully connected layer to obtain a fully connected vector, and the fully connected vector is processed by an activation function to obtain a prediction result set of the event body in the text to be processed, the prediction result set comprises a confidence that a current position in the text to be processed is a start position or an end position of the event body, and if the confidence is greater than a threshold, the corresponding position will be labeled as "1", otherwise it will be labeled as "0", i.e., the prediction result set obtained may comprise "0" and "1". The position with an output of "0" is not the start position or the end positon of the event body, and the position with an output of "1" is the start position or the end positon of the event body. For example, positions with a confidence greater than 0.45 may be taken as the start position or the end position of the event body. Therefore, a text corresponding to the positions labeled as "1" may be cut out from the originally inputted text to be processed, and an event body corresponding to the event type can be obtained.

Figure 7:
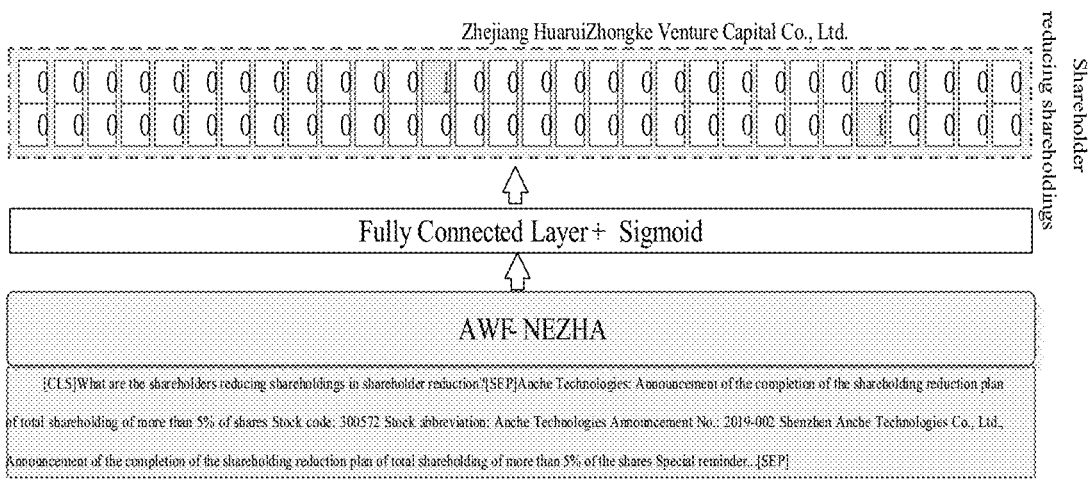
FIG. 7 is an exemplary schematic view of a procedure of determining an event body provided in an embodiment of the present application.

Exemplarily, as shown in FIG. 7, after the event type corresponding to the text to be processed is determined, a first query corpus may be constructed based on the event type, for example, the determined event type is shareholder reduction, according to a preset mapping relationship between the event type and the event body, it is determined that the event body corresponding to shareholder reduction is the shareholders reducing shareholdings, so the first query corpus may be constructed as "What are the shareholders reducing their shareholdings in shareholder reduction?", and then the first query corpus may be spliced with the text to be processed according to a preset format to obtain a second spliced text, e.g., the second spliced text may be "[CLS] What are the shareholders reducing their shareholdings in shareholder reduction?[SEP]Anche Technologies: Announcement of the completion of the shareholding reduction plan of total shareholding of more than 5% of shares Stock code: 300572 Stock abbreviation: Anche Technologies Announcement No.: 2019-0 02 Shenzhen Anche Technologies Co., Ltd., on the shareholder Zhejiang Huarui Deyin Venture Capital Co., Ltd. and its person acting in concert Zhejiang Huarui Zhongke Venture Capital Co., Ltd., who hold a total share of more than 5% of the shares . . . [SEP]".

Then the text to be processed and the first query corpus are inputted into a first model, the first model comprising a second semantic extraction model AWF-NEZHA and a second output model. The second spliced text may be inputted into the second semantic extraction model first, to obtain at least one second semantic vector, and the at least one second semantic vector is spliced to obtain a second semantic vector sequence, and the second semantic vector sequence is subjected to binary classification processing via the fully connected layer and the activation function sigmoid in the second output model, to obtain a prediction result set, and the prediction result set may comprise "0" and "1", thus the start position and the end position of the event body in the text to be processed may be determined. Based on positions labeled as "1", a text corresponding to the positions labeled as "1" is cut out from the originally inputted text to be processed, and an event body corresponding to the event type can be obtained, e.g., the event body of shareholder reduction in the text to be processed is "Zhejiang Huarui Zhongke Venture Capital Co., Ltd."

S303, constructing a second query corpus based on the event body.

There can be a mapping relationship between the event type and the event elements, and an example of the mapping relationship can be shown in the following table:

| Event type | Event element | Event element | Event element | Event element | Event element |
|---|---|---|---|---|---|
| Death of senior executives | Company name | Senior executives | Position of senior executives | Time of death | Age of death |
| Bankruptcy liquidation | Time of publication | Company name | Industry of company | Court of acceptance | Time of decision |
| Major asset loss | Time of publication | Company name | Amount of loss | Other loss | |
| Major compensation | Time of publication | Company name | Amount of compensation | Object of compensation | |
| Major safety accident | Time of publication | Company name | Casualties | Amount of loss | Other influence |
| Shareholder increase | Amount of increase | Shareholder increasing its shareholdings | Start date of increase | | |
| Shareholder reduction | Amount of reduction | Shareholder reducing its shareholdings | End date of reduction | | |
| Equity freeze | Frozen amount | Frozen shareholder | Start time of freeze | End date of freeze | |
| Equity pledge | Amount of pledge | Pledger | Pledgee | Start date of pledge | End date of pledge |

Correspondingly, there is also a corresponding mapping relationship between the event type and the event element, so a mapping relationship may also be established between the event body and the event element. Exemplarily, when the event type is shareholder reduction, the corresponding event body is the shareholder reducing shareholdings, and the corresponding event elements comprise the start date of reduction and the amount of reduction; when the event type is shareholder increase, the corresponding event body is the shareholder increasing shareholdings, and the corresponding event elements comprise the start date of increase and the amount of increase.

After the event body is determined, since each event body may correspond to a plurality of event elements, a second query corpus may be constructed for each event body according to a predefined template based on the plurality of event elements, and the predefined template may be "event body #role1, role2 #role3 . . . ", i.e., the event body and the event elements are separated by #, and the event elements are separated by commas. For example, the extracted event body is "Zhejiang HuaruiZhongke Venture Capital Co., Ltd.", and the constructed second query corpus is "Zhejiang HuaruiZhongke Venture Capital Co., Ltd. #amount of reduction, start date of reduction".

S304, splicing the second query corpus with the text to be processed to obtain a third spliced text.

Specifically, after the second query corpus is obtained, the second query corpus may be spliced with the text to be processed according to a preset format to obtain a third spliced text, and the preset format may be [CLS]+second query corpus+[SEP]+text to be processed+[SEP].

For example, the determined event body is "Zhejiang HuaruiZhongke Venture Capital Co., Ltd.", and the constructed second query corpus is "Zhejiang HuaruiZhongke Venture Capital Co., Ltd. #amount of reduction, start date of reduction", and the obtained third spliced text may be "[CLS]Zhejiang HuaruiZhongke Venture Capital Co., Ltd. #amount of reduction, start date of reduction[SEP]Anche Technologies: Announcement of the completion of the shareholding reduction plan of total shareholding of more than 5% of shares Stock code:300572 Stock abbreviation: Anche Technologies . . . [SEP]".

S305, inputting the third spliced text into the second model to determine the event element corresponding to the event body.

The second model may comprise a third semantic extraction model and a third output model, and after the third spliced text is obtained, the third spliced text may be inputted into the third semantic extraction model first to obtain at least one third semantic vector, and the at least one third semantic vector is spliced to obtain a third semantic vector sequence, and then the third semantic vector sequence is subjected to binary classification processing by the third output model to determine a span of the event element in the text to be processed. In some embodiments, performing binary classification processing on the third semantic vector sequence by the third output model to determine a span of the event element in the text to be processed comprises: for each character in the third semantic vector sequence, determining whether the character is a span of the event element using a binary classification network in the third output model.

The third semantic extraction model may be a pre-training language model AWF-NEZHA configured to extract semantic features of the text to be processed and the second query corpus. Similar to the first semantic extraction model in structure, the third semantic extraction model comprises a plurality of transformation models Transformer Encoders connected sequentially and output sub-models in one-to-one correspondence with the transformation models. The output sub-model may comprise a fully connected layer Dense and an activation function.

In this embodiment, after the third spliced text is obtained, the procedure of inputting the third spliced text into the third semantic extraction model to obtain at least one third semantic vector is similar to the procedure of inputting the first spliced text into the first semantic extraction model to obtain at least one first semantic vector.

The plurality of third semantic vectors may be spliced to obtain a third semantic vector sequence, and then the third semantic vector sequence is subjected to binary classification processing via the third output model, for example, the third semantic vector sequence may be processed by a fully connected layer to obtain a fully connected vector, and the fully connected vector is processed by an activation function to obtain a span of the event element in the text to be processed.

As compared with the prior art, a plurality of event elements can be extracted together in this embodiment, i.e., by constructing the second query corpus, all event elements of the current event body are spliced together as the input of the second model, so that the event elements can be extracted completely and rapidly.

In order to extract a plurality of event elements simultaneously, a span of each event element in the sequence may be determined by generating two sequences including 0 and 1 by means of a plurality of binary classification networks in the third output model, where each span is determined by a head position pointer "start" and a tail position pointer "end", and the span is subjected to role classification by using the plurality of binary classification networks (herein, the term "role" is configured to distinguish different event elements, e.g., the event elements of the amount of reduction and the start time of reduction are of different roles.) That is, each character in the input sequence may represent a start or end position of an event element, and a span composed of a text between any two characters may represent an event element.

Figure 8:
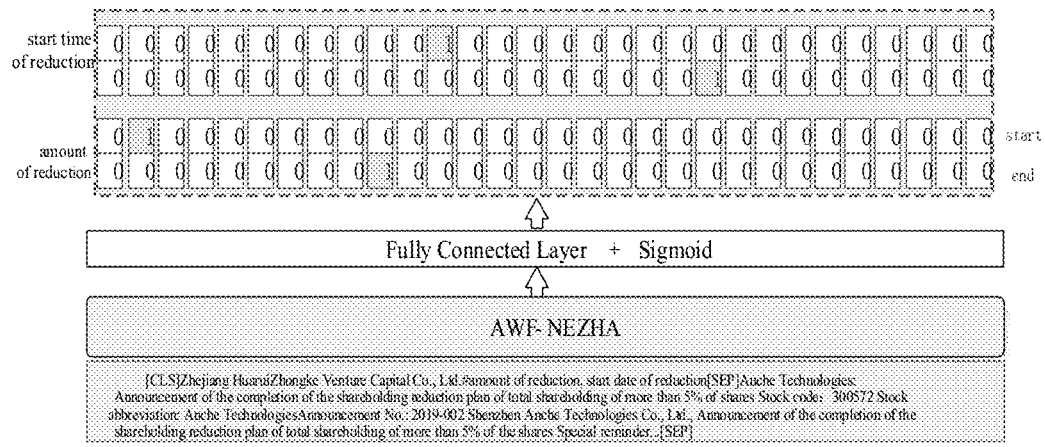
FIG. 8 is an exemplary schematic view of a procedure of determining event elements provided in an embodiment of the present application.

Exemplarily, as shown in FIG. 8, after the event body is determined, a second query corpus may be constructed for the event body according to a preset template, for example, the extracted event body is "Zhejiang HuaruiZhongke Venture Capital Co., Ltd.", and the constructed second query corpus is "Zhejiang HuaruiZhongke Venture Capital Co., Ltd. #amount of reduction, start time of reduction", and the second query corpus is spliced with the text to be processed according to a preset format to obtain a third spliced text, and the third spliced text may for example be "[CLS] Zhejiang HuaruiZhongke Venture Capital Co., Ltd. #amount of reduction, start time of reduction[SEP]Anche Technologies: Announcement of the completion of the shareholding reduction plan of total shareholding of more than 5% of total shares Stock code: 00572 Stock abbreviation: Anche Technologies . . . [SEP]", and the third spliced text is inputted into a second model cascaded with a first model in a reading comprehension model, the second model comprising a third semantic extraction model AWF-NEZHA and a third output model. The third spliced text may be inputted into the third semantic extraction model first to obtain at least one third semantic vector, and the at least one third semantic vector is spliced to obtain a third semantic vector sequence, and then the third semantic vector sequence is subjected to binary classification processing via a fully connected layer and an activation function Sigmoid in the third output model, to obtain a prediction result sequence, the prediction result sequence comprising 0 and 1, and a span of an event element in the text to be processed may be determined based on a position corresponding to 1 in the prediction result sequence, the span comprising a head position pointer "start" and a tail position pointer "end". In other words, each character in the result sequence may be subjected to binary classification processing to determine whether it is a head position or tail position of an event element. Therefore, for a single event element, two binary classification networks may be employed to determine the head position and tail position of the event element. In other words, a set of binary classification networks comprising two binary classification networks may be used to label a span of each event element. Correspondingly, multiple sets of binary classification networks may be used to label spans of the event elements based on the number of the event elements to be labeled. For example, four binary classification networks may be used to perform role classification on the spans of the two event elements of "start time of reduction" and "amount of reduction", to determine the two event elements of start time of reduction and amount of reduction.

The reading comprehension model is pre-trained based on historical text data. As a possible implementation, the procedure of training the reading comprehension model may comprise: acquiring historical text data, the historical text data comprising a sample text and an event body and event elements corresponding to the sample text, and the historical text data is divided into a training set and a validation set, the training set is configured to train an initial first model and second model, to obtain a trained first model and second model, and the validation set is configured to validate the trained first model and second model to validate the performance of the first model and the second model. That is, the first model and second model to be constructed are trained using the training set, to obtain a first model and second model to be validated, and then the first model and second model to be validated are optimized to minimize a second loss function with the validation set, to obtain a first model and a second model, based on which the reading comprehension model is obtained.

During the training of the reading comprehension model, the historical text data may be inputted into the initial first model, to obtain a first output result, and the first output result may be represented by the following formula:

$$t_i^s = \sigma(W_s x_i + b_s)$$

$$t_i^e = \sigma(W_e x_i + b_e)$$

where, $x_i = h_{DWF}[i]$, i.e., a vector representation of the i-th character in the text to be processed after being encoded by an encoder, $\sigma$ is Sigmoid activation function, $W_{start}$, $W_{end}$ are trainable weights, $b_s$, $b_e$ are corresponding bias terms, $t_i^s$, $t_i^e$ are respectively a probability that the i-th character in the current text to be processed is the start position and the end position of the event body, and when the probability is greater than a threshold, the corresponding position will be labeled as 1, otherwise it will be labeled as 0.

After the first input result is obtained, a first optimized objective function of the first model can be determined, and the first optimized objective function may be presented by the following formula:

$$loss_{subject} = -\sum_{i=1}^{n+2} \tilde{t}_i^s \log(t_i^s) - \sum_{j=1}^{n+2} \tilde{t}_j^e \log(t_j^e)$$

where n is the length of the input sequence; $\tilde{t}_i^s, \tilde{t}_i^e$ are correct classification labels that are known.

Then the first output result is inputted into the second model to obtain a second output result, and since the role of each event element corresponds to a set of pointer vectors (start, end), and the pointer vectors of all event elements are combined respectively to form two two-dimensional matrices, denoted by $s_s$, $s_e$, that is, each row of $s_s$, $s_e$ represents a role of an event element, and each column corresponds to a character in the text. For the role of each event element, a respective binary classification network may be used to predict a start position and an end position thereof in the text. Therefore, for the text to be processed, a plurality of binary classification networks may be used to predict a pointer vector corresponding to the role of each predefined event element in the input sequence, and the probability of the start and end position of the vent element is presented by the position of the pointer vector being 0 or 1. In other words, each character in the inputted first output result is subjected to multi-label classification, and the probability values $p_i^{s-r}$, $p_i^{e\_r}$ of the i-th charactering being predicted to be the start and end position of event element r are represented respectively by:

$$p_i^{s\_r}=\sigma(W_s^r x_i+b_s^r)$$

$$p_i^{e\_r}=\sigma(W_e^r x_i+b_e^r)$$

where, s and e represent start and end, $W_s^r$, $W_e^r$ are trainable weight vectors, $b_s^r$, $b_e^r$ are bias terms, and $\sigma$ is Sigmoid activation function. A second optimized objective function can be determined, which is represented as:

$$loss_{argument}=-\sum_{i=k}^{m+3} y_i^{s\_r}\log(p_i^{s\_r})-\sum_{j=k}^{m+3} y_j^{e\_r}\log(p_j^{e\_r})$$

where in is the entire length of the input sequence, and $y_i^{s\_r}$, $y_i^{e\_r}$ are correct role labels of the event elements that are known, k is the length of query, i.e., the loss of the query is not taken into consideration when calculating the loss function. Then, the first optimized objective function corresponding to the first model and the second optimized objective function corresponding to the second model are added to obtain a second loss function, and the second loss function may be represented by the following formula:

$$loss=loss_{subject}+loss_{argument}$$

where $loss_{subject}$ is the first optimized objective function, and $loss_{argument}$ is the second optimized objective function and loss is the second loss function. Parameters of the first model and second model are optimized to minimize the second loss function, to obtain the first model and the second model, thereby obtaining the reading comprehension model.

S105, determining an event extraction result of the text to be processed based on the event body and the event element.

In this step, after the event body and the event element are determined, an index value of the event element in the text to be processed may be acquired, the index value being configured to label a position of the event element in the text to be processed, and then the event element corresponding to the event body is sorted according to the index value to obtain an event extraction result of the text to be processed. Since one same event body may correspond to multiple different event elements, different event elements may be assigned to the same event body according to the index values, to obtain an event extraction result of the text to be processed, and the event extraction result may be for example be presented in a form of table.

Figure 9:
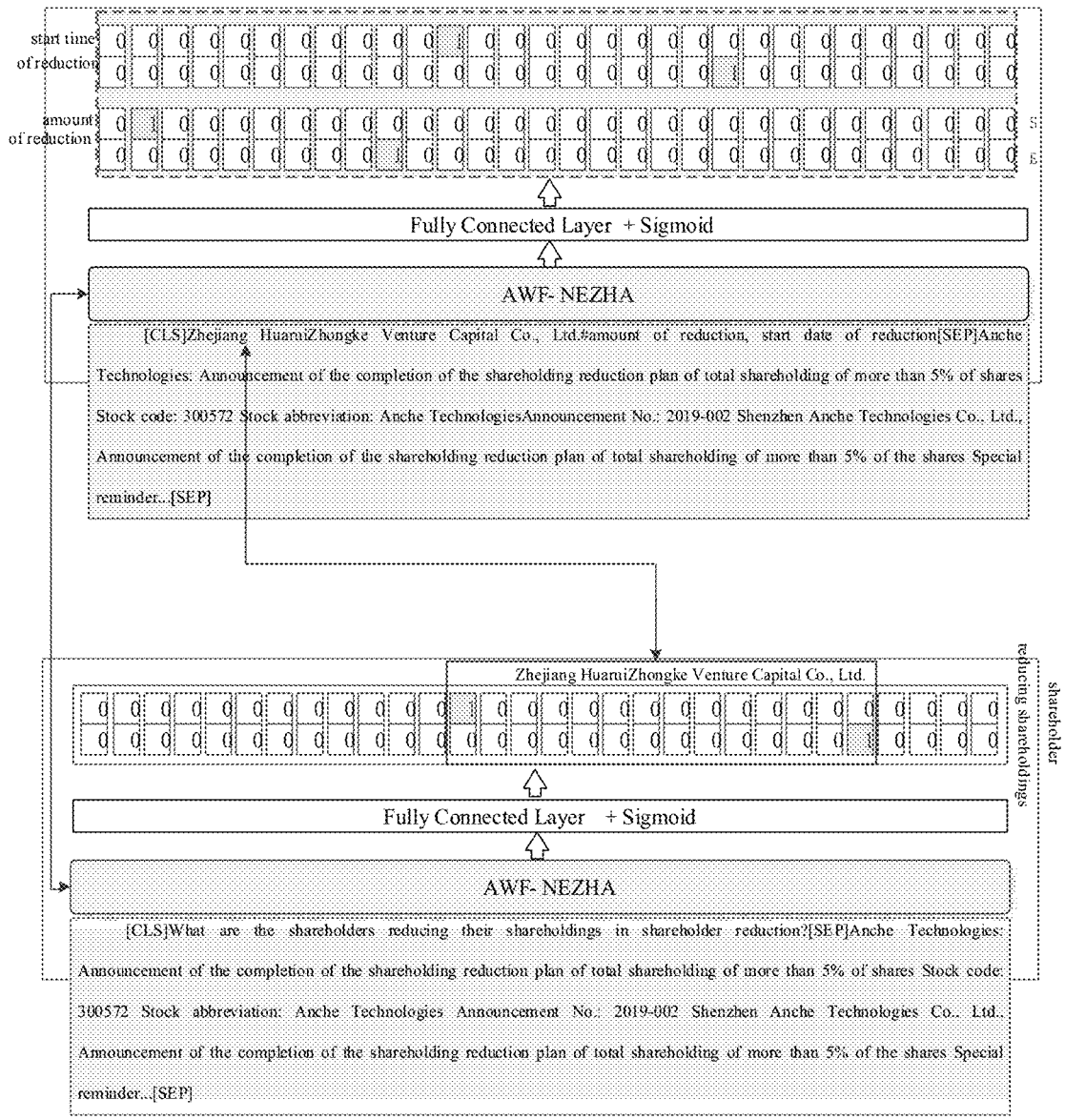
FIG. 9 is an exemplary schematic view of a procedure of determining an event body and event elements provided in an embodiment of the present application.

Exemplarily, as shown in FIG. 9, after the event type corresponding to the text to be processed is determined, a first query corpus may be constructed according to the event type, e.g., the determined event type is shareholder reduction, and a first query corpus will be constructed for each event body according to a mapping relationship predefined between the event type and the event body, e.g., when the determined event type is shareholder reduction, a first query corpus may be constructed as "What are the shareholders reducing their shareholdings in shareholder reduction?" After that, the first query corpus may be spliced with the text to be processed according to a preset format to obtain a second spliced text, e.g., the second spliced text may be "[CLS]What are the shareholders reducing their shareholdings in shareholder reduction?[SEP]Anche Technologies: Announcement of the completion of the shareholding reduction plan of total shareholding of more than 5% of shares Stock code: 300572 Stock abbreviation: Anche Technologies Announcement No.: 2019-0 02 Shenzhen Anche Technologies Co., Ltd., on the shareholder Zhejiang HuaruiDeyin Venture Capital Co., Ltd. and its person acting in concert Zhejiang HuaruiZhongke Venture Capital Co., Ltd., who hold a total share of more than 5% of the shares . . . [SEP]".

Then the text to be processed and the first query corpus are inputted into a first model of the reading comprehension model, the first model comprising a second semantic extraction model AWF-NEZHA and a second output model, and the second spliced text may be inputted into the second semantic extraction model first, to obtain at least one second semantic vector, and the at least one second semantic vector is spliced to obtain a second semantic vector sequence, and the second semantic vector sequence is subjected to binary classification processing via the fully connected layer and the activation function Sigmoid in the second output model, to obtain a prediction result set, and the prediction result set may comprise 0 and 1, so that the start position and the end position of the event body in the text to be processed may be determined. According to a position labeled as 1, a text corresponding to the position is cut out in a corresponding position of the originally inputted text to be processed, and an event body corresponding to the event type can be obtained, and the event body of the shareholder reducing shareholdings in the text to be processed is "Zhejiang HuaruiZhongke Venture Capital Co., Ltd."

After the event body is determined, a second query corpus may be constructed for the event body according to a preset template, for example, based on the extracted event body "Zhejiang HuaruiZhongke Venture Capital Co., Ltd.", the constructed second query corpus is "Zhejiang HuaruiZhongke Venture Capital Co., Ltd. #amount of reduction, start date of reduction", and the second query corpus is spliced with the text to be processed according to a preset format to obtain a third spliced text, and for example the third spliced text may be "[CLS]Zhejiang HuaruiZhongke Venture Capital Co., Ltd. #amount of reduction, start date of reduction[SEP]Anche Technologies: Announcement of the completion of the shareholding reduction plan of total shareholding of more than 5% of shares Stock code: 300572 Stock abbreviation: Anche Technologies . . . [SEP]", and the third spliced text is inputted into a second model cascaded with a first model in the reading comprehension model, the second model comprising a third semantic extraction model AWF-NEZHA and a third output model, and the third spliced text may be inputted into the third semantic extraction model first to obtain at least one third semantic vector, and the at least one third semantic vector is spliced to obtain a third semantic vector sequence, and then the third semantic vector sequence is subjected to binary classification processing via a binary classification network (e.g., a fully connected layer and an activation function Sigmoid) in the third output model, to obtain a prediction result sequence, the prediction result sequence comprising 0 and 1, and a span of an event element in the text to be processed may be determined based on a position corresponding to 1 in the prediction result sequence, the span comprising a head position pointer "start" and a tail position pointer "end". For multiple event elements, multiple binary classification networks may be used to label spans corresponding to different event elements. For example, for event elements of "start time of reduction" and "amount of reduction", two binary classification networks may be used to label a head position and a tail position of each event element respectively. The labeling procedure may also be described as: for each character in the third semantic vector sequence, labeling and determining the probability that it is a head position and tail position of the event element "start time of reduction" and the probability that it is a head position and tail position of the event element "amount of reduction" respectively. After the event body and the event elements are determined, index values of the event elements in the text to be processed may be acquired, and according to the index values, a plurality of different event elements may be assigned to one same event body to obtain an event extraction result, and an example of the event extraction result may be represented by the following table:

| Shareholder reduction | | |
|---|---|---|
| Shareholder reducing shareholdings | Amount of reduction | End date of reduction |
| Zhejiang HuaruiZhongke Venture Capital Co., Ltd. | 238545 | Jan. 7, 2019 |
| Zhejiang HuaruiDeyin Venture Capital Co., Ltd. | 8000 | Jan. 7, 2019 |
| Zhejiang HuaruiDeyin Venture Capital Co., Ltd. | 230545 | Jan. 8, 2019 |

Figure 10:
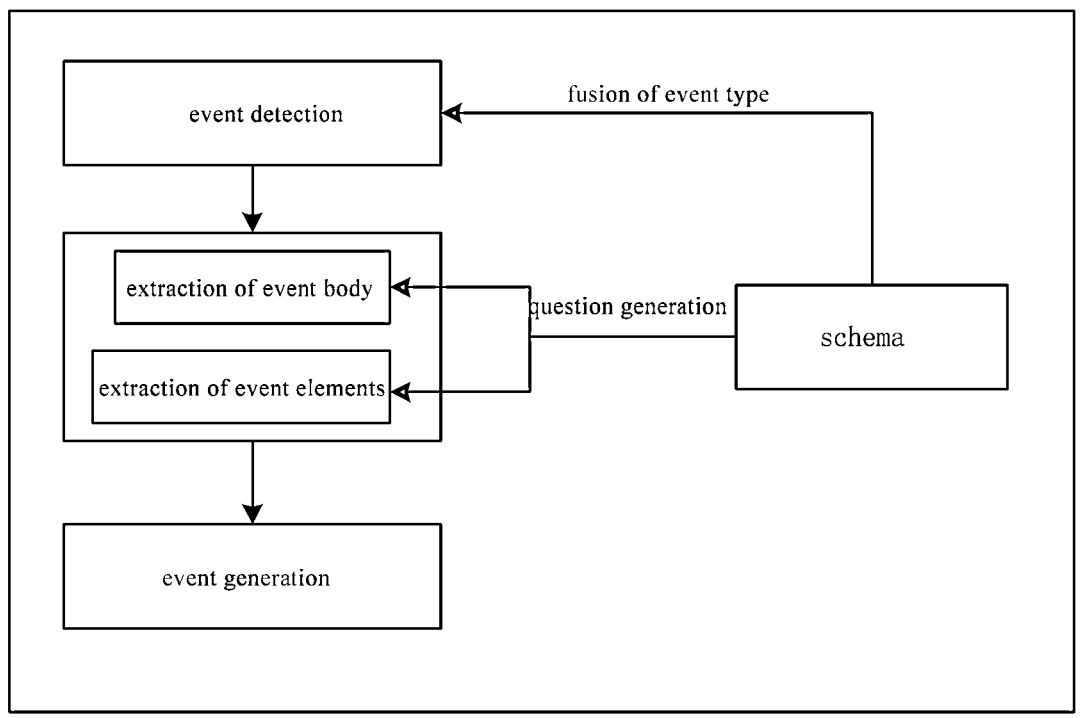
FIG. 10 is an exemplary schematic view of a major procedure of event extraction provided in an embodiment of the present application.

As shown in FIG. 10, for the event extraction method provided in the embodiments of the application, according to a predefined event schema comprising all event types, all event types and a text to be processed are inputted into an event detection model to obtain an event type involved in the text to be processed, and a first query corpus is constructed based on the event type, and then the first query corpus and the text to be processed are inputted into a reading comprehension model to extract an event body, and then an event element is extracted from the text to be processed based on the event body, and in turn a corresponding event extraction result is generated based on the event body and the event element. This technical solution can accurately determine the event type, the event body and the event elements involved in the text to be processed, and is adapted to event extraction in a document level text, thereby improving the overall performance of event extraction and further promoting the efficiency of event extraction.

Figure 11:
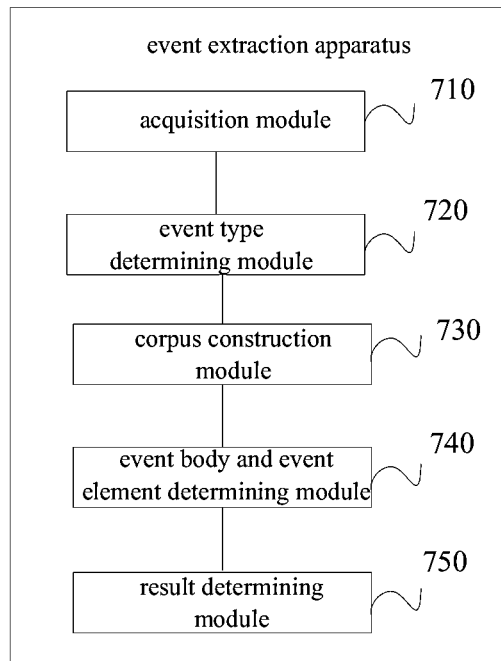
FIG. 11 is a schematic structure view of an event extraction apparatus provided in an embodiment of the present application.

In another aspect, FIG. 11 is a schematic structure view of an event extraction apparatus provided in an embodiment of the application. The apparatus may be an apparatus arranged within a terminal or a server, and as shown in FIG. 11, the apparatus 700 comprises: an acquisition module 710, configured to acquire a text to be processed; an event type determining module 720, configured to receive the text to be processed and determine an event type involved in the text to be processed; a corpus construction module 730, configured to construct a first query corpus based on the event type; an event body and event element determining module 740, configured to receive the text to be processed and the first query corpus to determine an event body corresponding to the event type and an event element corresponding to the event body; a result determining module 750, configured to obtain an event extraction result of the text to be processed based on the event body and the event element.

In some embodiments, the event type determining module 720 is further configured to: splice the text to be processed with predefined event types to obtain a first spliced text; input the first spliced text into the first semantic extraction model to obtain at least one first semantic vector; splice the at least one first semantic vector to obtain a first semantic vector sequence; perform binary classification processing on the first semantic vector sequence via the first output model to determine the event type involved in the text to be processed from the predefined event types.

In some embodiments, the event type determining module 720 is further configured to: encode the first spliced text into a word embedded vector and a position embedded vector; add the word embedded vector and the position embedded vector to obtain an input vector; provide the input vector to the plurality of transformation models, thereby outputting a corresponding sub-output vector from each transformation model; classify by each output sub-model of the plurality of output sub-models a sub-output vector outputted from a corresponding transformation model to obtain a sub-weight vector corresponding to the transformation model; normalize the sub-weight vectors corresponding to the plurality of transformation models to obtain a total weight vector; splice sub-output vectors corresponding to the plurality of transformation models to obtain a total output vector; obtain the first semantic vector based on the total output vector and the total weight vector.

In some embodiments, the event body and event element determining module 740 comprises a first model and a second model cascaded with the first model, and the event body and event element determining module 740 is further configured to: splice the first query corpus with the text to be processed to obtain a second spliced text; input the second spliced text into the first model to determine the event body corresponding to the event type; construct a second query corpus based on the event body; splice the second query corpus with the text to be processed to obtain a third spliced text; input the third spliced text into the second model to determine the event elements corresponding to the event body.

In some embodiments, the first model comprises a second semantic extraction model and a second output model, and the event body and event element determining module 740 is further configured to: input the second spliced text into the second semantic extraction model to obtain at least one second semantic vector; splice the at least one second semantic vector to obtain a second semantic vector sequence; perform binary classification processing on the second semantic vector sequence using the second output model to determine a start position and an end position of the event body in the text to be processed; determine the event body corresponding to the event type based on the start position and the end position.

In some embodiments, the second model comprises a third semantic extraction model and a third output model, and the event body and event element determining module 740 is further configured to: input the third spliced text into the third semantic extraction model to obtain at least one third semantic vector; splice the at least one third semantic vector to obtain a third semantic vector sequence; perform binary classification processing on the third semantic vector sequence using the third output model to determine a span of the event element in the text to be processed.

In some embodiments, the event body and event element determining module is further configured to: for each character in the third semantic vector sequence, determine whether the character is a span of the event element by a binary classification network in the third output model.

In some embodiments, the result determining module is configured to: acquire an index value of the event element in the text to be processed; based on the index value, sort the event element corresponding to the event body to obtain the event extraction result.

It could be understood that the functions of each functional module in the event extraction apparatus in the embodiments may be specifically implemented according to the method in the method embodiments, and for the specific implementations, related description in the method embodiment may be referred to, which will not be repeated herein for simplicity.

In yet another aspect, the embodiments of the present application provide a terminal device, comprising a memory, a processor and a computer program stored on the memory and runnable on the processor, the processor being configured, when executing the program, to implement the event extraction method according to the above embodiments.

Figure 12:
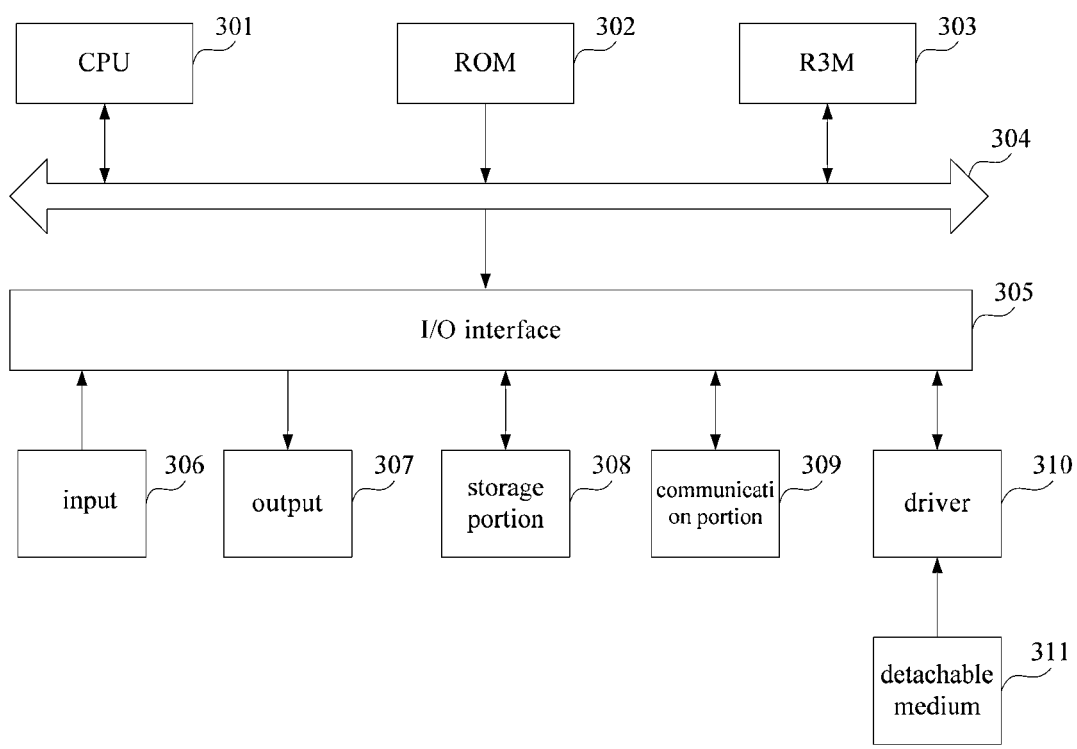
FIG. 12 is an exemplary structure view of a terminal device as shown in an embodiment of the present application.

Referring to FIG. 12, which is a schematic structure view of a terminal device provided in an embodiment of the present application.

As shown in FIG. 12, the terminal device 300 comprises a central processing unit (CPU) 301, which may perform various appropriate actions and processes according to a program stored in a read only memory (ROM) 302 or a program loaded from the storage part 303 into a random access memory (RAM) 303. In RAM 303, various programs and data required by the operation of the system 300 are further stored. CPU 301, ROM 302 and RAM 303 are connected with each other via a bus 304. An input/output (I/O) interface 305 is also connected to the bus 304.

The following parts are connected to the I/O interface 305: an input part 306 such as a keyboard, a mouse, etc.; an output part 307 such as a cathode ray tube (CRT), a liquid crystal display (LCD), a speaker, etc.; a storage part 308 such as a hard disk, etc.; and a communication part 309 including a network interface card such as a LAN card, a modem, and the like. The communication part 309 performs communication processing via a network such as the Internet. A driver 310 is also connected to the I/O interface 305 as needed. A detachable medium 311 such as a magnetic disk, an optical disk, a magnetic optical disk, a semiconductor storage and so on is installed on the driver 310 as needed such that a computer program read therefrom is installed in the storage part 308 as needed.

According to an embodiment of the application, the event extraction method described above with reference to the flow chart may be implemented as a computer software program. For example, an embodiment of the present application comprises a computer program product, comprising a computer program carried on a machine-readable medium, the computer program comprising program codes for implementing the method according to the previous embodiments. In such an embodiment, the computer program may be downloaded from a network and installed via the communication part 303, and/or installed from the detachable medium 311. When executed by the central processing unit (CPU) 301, the computer program implements the above functions defined in the system of the present application.

It should be noted that the computer-readable medium as shown in the present application may be a computer-readable signal medium or a computer-readable storage medium or any combination thereof. The computer-readable storage medium may be, for example, but is not limited to, an electrical, magnetic, optical, electromagnetic, infrared, or semiconductor system, apparatus, or device, or any combination thereof. More specific examples of the computer-readable storage media may include, but are not limited to: electrical connection with one or more wires, portable computer disk, hard disk, random access memory (RAM), read-only memory (ROM), erasable programmable read-only memory (EPROM or flash memory), optical fiber, portable compact disk read-only memory (CD-ROM), optical storage device, magnetic storage device, or any suitable combination thereof. The computer-readable storage medium herein may be any tangible medium that contains or stores a program, and the program may be used by or in combination with an instruction execution system, apparatus, or device. The computer-readable signal medium herein may include a data signal that is propagated in a baseband or as a part of a carrier wave, and carries computer-readable program codes therein. The data signal propagated in this way may have many forms, including but not limited to electromagnetic signal, optical signal or any suitable combination thereof. The computer-readable signal medium may also be any computer-readable medium other than a computer-readable storage medium, and the computer-readable medium may send, propagate, or transmit a program for use by or in combination with an instruction execution system, apparatus, or device. The program codes contained on the computer-readable medium may be transmitted by any suitable medium, including but not limited to: wireless means, wired means, optical cable, RF, etc., or any suitable combination thereof.

Flow charts and diagrams in the drawings illustrate possible systematic architectures, functions and operations that can be implemented by the system, the method and the computer program product according to various embodiments of the application. In this regard, each box in the flow charts or the diagrams can represent a module, a program segment or a portion of codes, and the module, the program segment or the portion of codes comprises one or more executable instructions for implementing prescribed logic functions. It should also be noted that in some alternative implementations, the functions indicated in the boxes may also be performed in a sequence different from that indicated in the drawings. For example, two consecutive boxes may actually be executed substantially concurrently, and sometimes they may also be executed in an opposite sequence, and this depends on the functions involved. It should also be noted that each box in the diagrams and/or the flow charts and a combination of the boxes in the diagrams and/or the flow charts can be implemented by means of a hardware-based system for executing prescribed functions or operations, or by means of a combination of dedicated hardware and computer instructions.

The units or modules described in the embodiments of the application may be implemented by means of software or by means of hardware. The described units or modules may also be arranged in a processor, e.g., they may be described as: a processor, comprising: an acquisition module, a type determining module, a corpus construction module, an element determining module and a result determining module. The names of the units or modules do not limit the units or modules per se under certain circumstances, e.g., the acquisition module may also be described as "for acquiring the text to be processed".

In still another aspect, the present application further provides a non-transitory computer-readable storage medium, the computer-readable storage medium may be contained in the electronic device described in the above embodiments; or it may exist alone without being installed in the electronic device. The computer-readable storage medium stores one or more programs, and when executed by one or more processors, the programs are configured to implement the event extraction method according to the embodiments in the present application.

To sum up, the event extraction method, apparatus, device and storage medium provided in the embodiments of the present application acquire a text to be processed and input the text to be processed into an event detection model to determine an event type involved in the text to be processed, and construct a first query corpus based on the event type, and then input the text to be processed and the first query corpus into a reading comprehension model to determine an event body and an event element in the text to be processed, and determine an event extraction result of the text to be processed based on the event body and the event element. This technical solution can determine the event type in the text to be processed accurately, and determine the event elements in the text to be processed completely and accurately by constructing a first query corpus and using a reading comprehension module, and is adapted to event extraction in a document level text, thereby improving the overall performance of event extraction and further promoting the efficiency of event extraction.

What is described above is only part of the embodiments of the present application and explanations of the technical principles employed. Those skilled in the art should understand that the disclosure of the present application is not limited by the technical solutions formed by a specific combination of the above technical features, but instead, it should also cover other technical solutions formed by a random combination of the above technical features or equivalent features without deviating from the technical principles, for example, technical solutions formed by replacing the above features with technical features having similar functions as disclosed in the present application (but not limited thereto).

The invention claimed is:

1. An event extraction method, comprising:
acquiring a text to be processed;
inputting the text to be processed into an event detection model to determine an event type involved in the text to be processed;
constructing a first query corpus based on the event type;
inputting the text to be processed and the first query corpus into a reading comprehension model to determine an event body corresponding to the event type and an event element corresponding to the event body; and
obtaining an event extraction result of the text to be processed based on the event body and the event element,
wherein the event detection model comprises a first semantic extraction model and a first output model, wherein the inputting the text to be processed into the event detection model to determine the event type involved in the text to be processed comprises:
splicing the text to be processed with a predefined event type to obtain a first spliced text;
inputting the first spliced text into the first semantic extraction model to obtain at least one first semantic vector;
splicing the at least one first semantic vector to obtain a first semantic vector sequence; and
performing binary classification processing on the first semantic vector sequence via the first output model to determine the event type involved in the text to be processed from the predefined event type,
wherein the first semantic extraction model comprises a plurality of transformation models connected sequentially and a plurality of output sub-models in one-to-one correspondence with the plurality of transformation models, wherein the inputting the first spliced text into the first semantic extraction model to obtain the at least one first semantic vector comprises:
encoding the first spliced text into a word embedded vector and a position embedded vector;
adding the word embedded vector and the position embedded vector to obtain an input vector;
providing the input vector to the plurality of transformation models, thereby outputting a sub-output vector from each transformation model of the plurality of transformation models;
classifying by each output sub-model of the plurality of output sub-models the sub-output vector outputted from the transformation model to obtain a sub-weight vector corresponding to the transformation model;
normalizing a plurality of sub-weight vectors including the sub-weight vector corresponding to the plurality of transformation models to obtain a total weight vector;
splicing a plurality of sub-output vectors including the sub-output vector corresponding to the plurality of transformation models to obtain a total output vector; and
obtaining the first semantic vector based on the total output vector and the total weight vector,
wherein the event detection model is constructed by operations comprising:
acquiring historical text data, the historical text data comprising a training set and a validation set;
training a first semantic extraction model and first output model to be constructed with the training set, to obtain a first semantic extraction model and first output model to be validated; and
optimizing the first semantic extraction model and first output model to be validated by the validation set to minimize a first loss function, obtaining the first semantic extraction model and the first output model.

2. The event extraction method according to claim 1, wherein the reading comprehension model comprises a first model and a second model cascaded with the first model, wherein the inputting the text to be processed and the first query corpus into the reading comprehension model to determine the event body corresponding to the event type and event element corresponding to the event body comprises:
splicing the first query corpus with the text to be processed to obtain a second spliced text;
inputting the second spliced text into the first model to determine the event body corresponding to the event type;
constructing a second query corpus based on the event body;
splicing the second query corpus with the text to be processed to obtain a third spliced text; and
inputting the third spliced text into the second model to determine the event element corresponding to the event body.

3. The event extraction method according to claim 2, wherein the first model comprises a second semantic extraction model and a second output model, wherein the inputting the second spliced text into the first model to determine the event body corresponding to the event type comprises:
inputting the second spliced text into the second semantic extraction model to obtain at least one second semantic vector;
splicing the at least one second semantic vector to obtain a second semantic vector sequence;
performing binary classification processing on the second semantic vector sequence by the second output model to determine a start position and an end position of the event body in the text to be processed; and
determining the event body corresponding to the event type based on the start position and the end position.

4. The event extraction method according to claim 2, wherein the second model comprises a third semantic extraction model and a third output model, wherein the inputting the third spliced text into the second model to determine the event element corresponding to the event body comprises:
  inputting the third spliced text into the third semantic extraction model to obtain at least one third semantic vector;
  splicing the at least one third semantic vector to obtain a third semantic vector sequence; and
  performing binary classification processing on the third semantic vector sequence by the third output model to determine a span of the event element in the text to be processed.

5. The event extraction method according to claim 4, wherein the performing binary classification processing on the third semantic vector sequence by the third output model to determine the span of the event element in the text to be processed comprises:
  determining, for each character in the third semantic vector sequence, whether the character is the span of the event element by a binary classification network in the third output model.

6. The event extraction method according to claim 2, wherein the reading comprehension model is constructed by operations comprising:
  acquiring historical text data, the historical text data comprising a training set and a validation set;
  training a first model and second model to be constructed with the training set, to obtain a first model and second model to be validated; and
  optimizing the first model and second model to be validated by the validation set to minimize a second loss function, obtaining the first model and the second model.

7. The event extraction method according to claim 1, wherein the obtaining the event extraction result of the text to be processed based on the event body and the event element comprises:
  acquiring an index value of the event element in the text to be processed; and
  based on the index value, sorting the event element corresponding to the event body to obtain the event extraction result.

8. A terminal device comprising a memory, a processor and a computer program stored on the memory and runnable on the processor, the processor being configured, when executing the computer program, to implement the event extraction method according to claim 1.

9. The terminal device according to claim 8, wherein the reading comprehension model comprises a first model and a second model cascaded with the first model, wherein the inputting the text to be processed and the first query corpus into the reading comprehension model to determine the event body corresponding to the event type and event element corresponding to the event body comprises:
  splicing the first query corpus with the text to be processed to obtain a second spliced text;
  inputting the second spliced text into the first model to determine the event body corresponding to the event type;
  constructing a second query corpus based on the event body;
  splicing the second query corpus with the text to be processed to obtain a third spliced text; and
  inputting the third spliced text into the second model to determine the event element corresponding to the event body.

10. The terminal device according to claim 9, wherein the first model comprises a second semantic extraction model and a second output model, wherein the inputting the second spliced text into the first model to determine the event body corresponding to the event type comprises:
  inputting the second spliced text into the second semantic extraction model to obtain at least one second semantic vector;
  splicing the at least one second semantic vector to obtain a second semantic vector sequence;
  performing binary classification processing on the second semantic vector sequence by the second output model to determine a start position and an end position of the event body in the text to be processed; and
  determining the event body corresponding to the event type based on the start position and the end position.

11. The terminal device according to claim 9, wherein the second model comprises a third semantic extraction model and a third output model, wherein the inputting the third spliced text into the second model to determine the event element corresponding to the event body comprises:
  inputting the third spliced text into the third semantic extraction model to obtain at least one third semantic vector;
  splicing the at least one third semantic vector to obtain a third semantic vector sequence; and
  performing binary classification processing on the third semantic vector sequence by the third output model to determine a span of the event element in the text to be processed.

12. The terminal device according to claim 11, wherein the performing binary classification processing on the third semantic vector sequence by the third output model to determine the span of the event element in the text to be processed comprises:
  determining, for each character in the third semantic vector sequence, whether the character is the span of the event element by a binary classification network in the third output model.

13. The terminal device according to claim 8, wherein the obtaining the event extraction result of the text to be processed based on the event body and the event element comprises:
  acquiring an index value of the event element in the text to be processed; and
  based on the index value, sorting the event element corresponding to the event body to obtain the event extraction result.

14. A non-transitory computer-readable storage medium, comprising a computer program stored thereon, the computer program being configured to implement the event extraction method according to claim 1.

* * * * *